J. BIJUR.

PROCESS OF TREATING NEGATIVE POLE PLATES.

APPLICATION FILED JAN. 14, 1908.

12,871.

Reissued Oct. 27, 1908.

Witnesses

Ivan Konigsberg

E. Van Landt

Joseph Bijur, Inventor

By his Attorneys

Binney Brickenstein & Ogden

UNITED STATES PATENT OFFICE.

JOSEPH BIJUR, OF NEW YORK, N. Y., ASSIGNOR TO THE GENERAL STORAGE BATTERY COMPANY, A CORPORATION OF NEW YORK.

PROCESS OF TREATING NEGATIVE-POLE PLATES.

No. 12,871. Specification of Reissued Letters Patent. Reissued Oct. 27, 1908.

Original No. 845,391, dated February 26, 1907, Serial No. 309,986. Application for reissue filed January 14, 1908. Serial No. 410,869.

DIVISION A.

*To all whom it may concern:*

Be it known that I, JOSEPH BIJUR, a citizen of the United States, and a resident of the borough of Manhattan, city, county, and State of New York, have invented certain new and useful Improvements in Processes of Treating Negative-Pole Plates, of which the following is a specification accompanied by drawings.

This invention relates to a process of treating negative pole plates for storage batteries.

The invention is applicable to both Planté plates and pasted plates, and its objects are to prevent the loss of capacity in the plate and coherence of the porous sponge into a metallic mass, to insure permanent passage ways for the diffusion of the electrolyte and to secure strong and hardy plates which will not become permanently sulfated and which will have all the above desirable characteristics.

Further objects of the invention will hereinafter appear and to these ends the invention consists of the process for carrying out the above objects embodying the steps and features hereinafter fully described and claimed in this specification and illustrated by suitable apparatus in the accompanying drawings which show an apparatus for carrying out a portion of the process for the modification of the plate.

Figure 1:
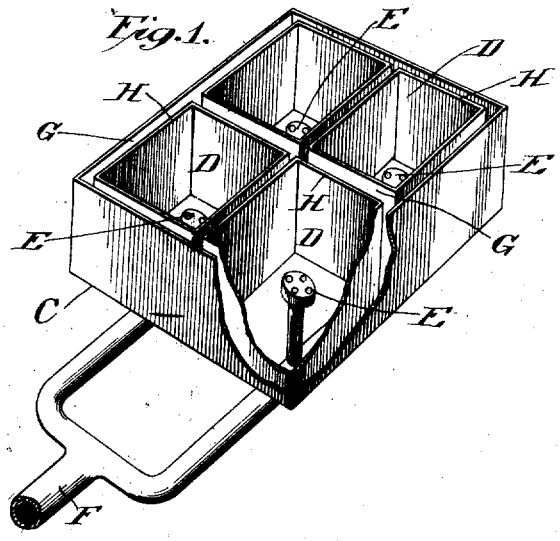
Figure 2:
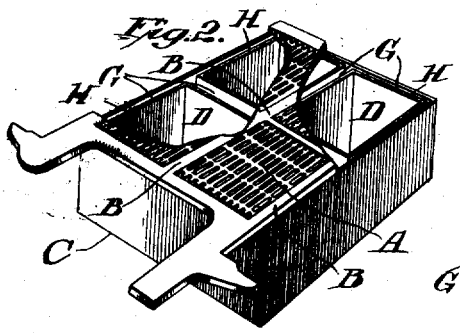
Figure 3:
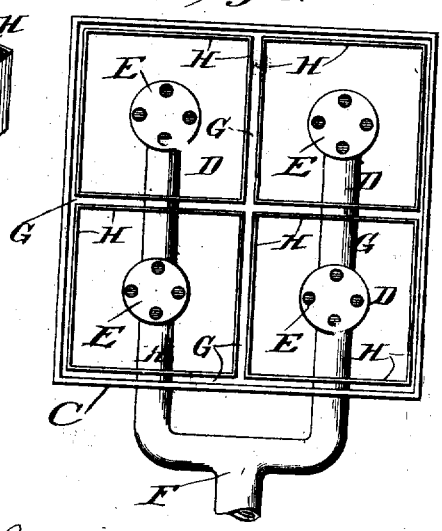

In the drawings, Figure 1 is a perspective view partly broken away showing heating apparatus; Fig. 2 is a perspective view showing a plate on the heating apparatus; and Fig. 3 is a top plan view of the apparatus on an enlarged scale to show the details of construction.

According to this process the active material on the plate is impregnated with inert material of a suitable character for carrying out the objects of the invention. This material should be of a character which will not be chemically acted upon nor of course be dissolved by the electrolyte, as for instance carbon. One of the leading characteristics of this invention resides in the fact that the plates are treated in accordance with this process after they have been formed or otherwise completed to form the pores, instead of having the inert material introduced into the mass of active material before the plate is finished, as for example by mechanically mixing an inert material with paste.

In carrying out the process for a Planté plate to be impregnated, for instance, with carbon, the plate is first formed and reduced to a negative pole plate in the usual manner and allowed to dry. It is then soaked for about ten minutes in a solution of sugar or other suitable substance by means of which the pores of the plate become filled with the solution. I find that a solution penetrates the pores of the plate readily, and a solution of sugar has been found to operate satisfactorily and well. The sugar solution may be of about two percent. to about thirty percent. strength, although other percentages may be found suitable for carrying out the process. I have found that the process is successfully carried out when the solution is at ordinary room temperature. The plate is then removed from the solution and it may be rinsed to rinse the sugar solution from the surface of the plate or else the rinsing may be omitted. The plate is then dried by permitting it to stand in air.

If the plate is all lead, it is baked in any suitable apparatus at a temperature of from about 240 degrees C. to 300 degrees C. until the sugar is substantially completely carbonized, which may take five or ten minutes.

If the plate has antimonious alloy parts, as for instance an alloy frame melting at a lower temperature than the remainder of the plate, it is treated in such manner that the alloy parts are heated less than the lead parts, so as to insure that they are not partially fused in the treatment.

In the drawings a frame of a heating apparatus is shown for heating a plate having an alloy frame.

A represents the plate and B the alloy frame.

The apparatus comprises a framework C preferably constructed of sheet steel and provided with compartments D, under each of which there is a gas burner E connected to a supply pipe F. Preferably the steel framework C is double in form and provided with the air spaces G between the walls H of the framework, and the compartments D are of substantially the same size as the grilles on the plate so that when the plate is laid on top of the framework C, as in Fig. 2, the grilles are arranged over the burners, and the framework B of the plate lies along the upper surfaces of the walls of the framework C and over the air spaces G in said framework. In accordance with this construction the grilles are subjected to a higher degree of heat than the frame of the plate. Any other suitable form of apparatus may be devised for carrying out the same objects, and the invention is not limited to the apparatus shown.

After the plate has been baked or heated, it may again be rinsed to remove any of the particles of sugar which were not converted into carbon in the heating process, and the plate is ready for use. It will be found that the pores of the plate have been impregnated with inert material in the form of carbon, forming an insoluble and substantially permanent deposit in the pores.

In carrying out the process after the plate is removed from the solution and allowed to dry the sugar solution in the pores deposits finely divided organic material in the plate, which material is at first sugar and is ultimately changed to a deposit of carbon by being carbonized in the step of heating. In accordance with this process the finely divided organic material is deposited very evenly and uniformly in the pores of the plate and it does not interfere with the natural coherence or strength of the lead. This invention enables inactive material to be introduced into the pores of Planté plates after they have been formed, and the process may be carried out with plates which have been in use. My invention enables inert material to be introduced into the pores of the active mass of negative pole Planté plates.

The process may also be carried out with pasted plates, for the invention enables the inactive material to be introduced into the pores of the active mass of pasted plates even after they have been in use and have partially lost their capacity from the lack of such material, thereby again raising the capacity of the plate. In treating pasted plates, after the plate is pasted and dried, or after it has been reduced to a negative condition, it is dipped in the sugar solution and allowed to remain for about ten minutes as before. It is then removed and allowed to dry in the air and heated at the same temperature as for a Planté plate, thereby substantially carbonizing the organic material in the pores of the plate deposited out of the solution, so that a pasted plate is obtained having inactive material incorporated in the paste. This is a very easy way of obtaining a uniform distribution of a very slight percentage of inactive material, and one which will not injuriously disintegrate the mass.

The invention also contemplates soaking a Planté or pasted plate in a solution of suitable material, as for instance sodium silicate, in which case the inactive material is deposited in the pores of the active mass in the plate chemically instead of by drying and carbonization. I make no claim to discovering that sodium silicate solution will react with sulfuric acid of strength such as is used in storage batteries to form silicic acid, or that various other soluble substances can be readily converted into solid deposits insoluble in the usual storage battery fluid, or that sugar and some other carbonaceous substances can be readily converted into carbon deposits in various ways, but it will be seen that I cause to take place by such means as these the formation within the pores of the plate of a fine deposit of inert insoluble substance.

The Planté plate after having been treated in accordance with this process assumes in the given instance of the carbon, a light brownish gray color instead of the usual lead gray color of the Planté plate. The plate after many discharges has a very porous and spongy appearance as distinguished from the ordinary Planté plate which has not been treated in accordance with this process. In use the capacity of the plate either remains substantially the same or rises at first instead of falling off, so that such an impregnated Planté negative should outlast many times a similar unimpregnated plate before losing, say, a third or a half of its capacity.

The impregnated plate as an article of manufacture forms the subject of a separate patent application of even date, No. 410,870.

I claim the following:

1. The process of treating plates adapted for use as negative pole plates, which consists in soaking the plate in a solution capable of penetrating the pores of the plate and there depositing an inert substance.

2. The process of treating plates to be used as negative pole plates, which consists in soaking the plate in a solution of an organic substance capable of penetrating the pores of the plate and then drying and heating the organic substance and thereby depositing in the pores an inert substance.

3. The process of treating plates to be used as negative pole plates, which consists in soaking the plate in a solution of sugar capable of penetrating the pores of the plate and there depositing an inert substance and ultimately subjecting the sugar to a carbonizing agent and thereby depositing said inert substance.

4. The process of treating plates adapted for use as negative pole plates, which consists of incorporating an inert substance in the pores of the active mass by treating said plate with a fluid capable of entering the pores and depositing inert material.

5. The process of treating plates adapted to be used as negative pole plates, which consists in soaking the plate in a solution of sugar capable of penetrating the pores of the plate and of there depositing at first sugar and ultimately carbon, then drying the plate to deposit sugar, and then heating the plate to carbonize the sugar and form the final inert deposit of carbon.

6. The process of treating plates to be used as negative pole plates, which consists in soaking the plate in a solution of a substance capable of penetrating the pores and of forming by the action of an appropriate agent a deposit of insoluble inactive substance and then removing the plate and subjecting the plate to the action of said agent, thereby causing the formation of such insoluble inactive substance within the pores.

7. The process of treating plates to be used as negative pole plates, which consists in soaking the previously formed plate in a solution of a substance capable of penetrating the pores and of forming with the aid of a suitable agent an insoluble deposit of inactive material, and subsequently removing the plate from the solution and exposing the plate to the action of the said agent and thereby producing within its pores deposits of insoluble inactive material.

8. The process of treating formed plates to be used as negative pole plates, which consists in impregnating the previously formed pores thereof with a solution of a substance capable of modification to form an insoluble inactive material, and then, as a subsequent procedure, modifying the said substance while within the pores thereby depositing such insoluble inactive material and finally washing the plate.

9. The process of treating plates for use as negative pole plates, after forming, which consists in depositing insoluble inactive material in the pores of the plate.

10. The process of treating plates carrying porous active mass, to be used as negative pole plates, which consists in impregnating the existing pores of the said active mass with a finely divided insoluble inactive material.

11. The process of treating plates carrying porous masses, to be used as negative pole plates, which consists in treating the plate with a solution of a soluble substance capable of penetrating into the existing pores and convertible into an insoluble inactive deposit, subsequently converting the soluble substance while in the pores into such insoluble inactive deposit, and then removing inactive solubles.

12. The process of treating plates to be used as negative pole plates, which consists in introducing into the pores thereof a fluid medium carrying material adapted to be converted into insoluble inactive material, and subsequently treating the material while within the pores to form a deposit of such inactive material.

13. The process of treating plates to be used as negative pole plates, which consists in impregnating the pores of the previously formed active portions with an inert substance by first introducing into the pores by means of a fluid carrying-medium a substance convertible to the said inert substance and subsequently converting it thereto while within the pores.

14. The process of treating plates for use as negative pole plates, which consists in introducing into the pores of the plate, by means of a fluid carrying-medium, a substance capable of forming by subsequent treatment an insoluble deposit, and then treating the plate to form such insoluble deposit.

15. The process of treating plates for use as negative pole plates, characterized by the step of soaking the plate in and impregnating its pores with a solution of a substance capable of producing with the aid of an appropriate agency an inert material in the said pores.

16. The process of treating plates for use as negative pole plates, characterized by the step of soaking the plate in and impregnating its pores with a solution of a substance capable of producing with the aid of an appropriate agency an inert material in the said pores, and by the further step of subjecting such material while in the pores to the said agency and there producing within the pores an inert material.

In testimony whereof I have signed this specification in the presence of two subscribing witnesses.

JOSEPH BIJUR.

Witnesses:
JAMES DIXON,
E. VAN LANDT.